United States Patent
Kim et al.

(10) Patent No.: US 8,359,743 B2
(45) Date of Patent: Jan. 29, 2013

(54) MANUFACTURING METHOD OF VALVE SEALANT FITTING

(76) Inventors: Do A Kim, Daegu (KR); Seong Cheol Han, Daegu (KR)

( * ) Notice: Subject to any disclaimer, the term of this patent is extended or adjusted under 35 U.S.C. 154(b) by 1008 days.

(21) Appl. No.: 12/394,496

(22) Filed: Feb. 27, 2009

(65) Prior Publication Data

US 2009/0217990 A1    Sep. 3, 2009

(30) Foreign Application Priority Data

Feb. 29, 2008  (KR) .................. 10-2008-0018869

(51) Int. Cl.
*B23P 17/00* (2006.01)
(52) U.S. Cl. .................. 29/888.46; 29/888.4; 29/888.43; 123/90.51; 123/188.8; 251/359; 251/368; 419/28; 419/32; 419/37
(58) Field of Classification Search .............. 29/888.4, 29/888.46, 888.43, 799; 123/90.51, 188.8; 251/359, 368; 419/28, 32, 37
See application file for complete search history.

(56) References Cited

U.S. PATENT DOCUMENTS

| 4,251,273 | A | * | 2/1981 | Smith et al. | 419/28 |
| 4,509,722 | A | * | 4/1985 | Ebihara | 251/359 |
| 5,537,744 | A | * | 7/1996 | Hirose | 29/888.43 |
| 6,684,492 | B2 | * | 2/2004 | Tachibana et al. | 29/799 |

* cited by examiner

*Primary Examiner* — Richard Chang
(74) *Attorney, Agent, or Firm* — John K. Park; Park Law Firm

(57) ABSTRACT

A valve sealant fitting includes a spring coupling unit having an internal screw thread for coupling unit assembly below the ball installation groove of the sealant body, the internal screw thread having a hexagonal groove for preventing a downward separation of the coil spring, allowing a fluid to flow and facilitating fastening and releasing of the screw, and having an external screw thread at an outer circumference of the spring coupling unit, and outer sealing O-rings disposed in O-ring installation grooves formed on respective upper and lower positions of the valve coupling taper screw part formed on the outer lower side of the sealant body.

1 Claim, 6 Drawing Sheets

MANUFACTURING METHOD OF VALVE SEALANT FITTING

TECHNICAL FIELD

The present invention relates to a valve sealant fitting and a method of manufacturing the same, and in particular, to a valve sealant fitting of high quality and a method of manufacturing the same, which not only allows a sealant to be rapidly and easily injected but also prevents a leakage of the sealant, which result in a more facilitated manufacturing process with reduced costs and a superior mechanical quality.

BACKGROUND ART

When a leakage typically occurs on a high pressure value or a low temperature valve mounted in a pipe line for gas or fluid (e.g., petrochemical material or the like) due to abrasion or scratch of a sealing portion within the valve, emergency measures are taken by mounting three or four sealant fittings in one valve to allow not only a sealant for fluid interception to be rapidly injected but also a lubricant for keeping smooth operations and functions of the valve to be filled/injected if necessary.

In the meantime, according to the conventional sealant fitting, a sealant injection groove having a small diameter is disposed on an inner upper side of the body of the sealant fitting and a ball installation groove having a relatively large diameter is disposed below the body. A metal ball is closely adhered between the sealant injection groove and the ball installation groove and then a ball seat and a coil spring are disposed below the metal ball to allow the sealant to be injected and to facilitate performing a function of preventing a fluid back-flow. The body at the bottom surface of the spring is press-bent to form a sustaining part for preventing the spring from being deviated downward. A protrusion is formed at an upper portion of the body, which is unfastened when the sealant needs to be injected and is fastened (by cap nuts) to block the injection port when the sealant injection is completed. In addition, a punched vent cap is coupled to a vent groove by screws for smoothly discharging an internal air at the time of fastening operation, and a screw coupling part capable of being coupled to a large-sized valve by screws is formed at an outer lower side of the body.

However, according to the conventional sealant fitting as described above, the press-bent sustaining part for mounting the spring in the fitting, preventing the spring from being deviated and sustaining the bottom surface is disposed on the body at the bottom surface of the spring, so that the sustaining part is structurally weak. Such a sustaining part does not cause a significant problem when it is applied for a low pressure valve. However, the reliability of the sustaining part as a component of a high pressure valve or an ultra-low temperature valve is degraded when it is applied for the high pressure valve due to a high possibility of having cracks or damages in use.

In addition, the conventional sealant fitting is focused on the injection of sealant or lubricant that passes through the internal sealant injection groove and the installation groove, so that a possibility of allowing the fluid to be leaked or flown out of the outer screw part disposed at the lower position of the body still exists.

That is, even when an external screw thread of the lower screw coupling part disposed for easy coupling of the sealant fitting at a predetermined position of the valve is coupled with an internal screw thread of the valve by a strong coupling force, fine gaps and corrosion may occur when a high valve pressure is applied thereto or when the valve is used for a long time, resulting in a leakage of sealant, lubricant, fluid or gas.

In the meantime, many times, processes and costs are required for processing and manufacturing the vent cap and the ball seat among the components of the conventional sealant fitting, thereby decreasing the productivity, economical efficiency, quality and safety thereof.

That is, according to the vent cap among the components of the sealant fitting, its outer shape is of a hexagon nut as shown in the drawing, its each edge is chamfered, it has a coupling groove with a constant diameter therein, an internal screw thread formed on an inner wall of the coupling groove, a protrusion formed on its inner upper central end, and one or more vent grooves formed on its upper end.

To process this, an annular rod (including a hexagon rod) formed of a stainless or cast steel is first cut by a constant length, and twelve processes including a process for hexagon nut head of an outer surface of the vent cap, a process for upper edge, a process for lower edge, a chamfering process for hexagon nut head, a primary groove process for forming an inner coupling groove, a secondary groove process for forming a protrusion, a fine process for protrusion, a process for internal screw, a process for vent groove, a face milling process for upper surface, a face milling process for lower surface, and so on are carried out using a metal cutting tool such as shelf, milling or the like, so that many times and costs are unnecessarily consumed for the processing and manufacturing.

A process for internal groove, a process for lower spring sustaining part, a process for forming a groove for closely adhering the ball and the fluid communication, a chamfering process and so on are also required for processing the internal groove formed in the ball seat, the lower spring sustaining part, and the groove for closely adhering the ball and the fluid communication of the ball seat among the components of the sealant fitting, so that many processes and costs are consumed to decrease the economical efficiency and the price competition.

In addition, when the vent cap and the ball seat are manufactured using the conventional tools, the process quality is finely changed per each product when the process environment, an operator, an abrasion state of the tool or the like is changed, so that the quality safety and the uniformity are also degraded.

Further, the metal ball as an essential component for blocking or adjusting the fluid communication among the components of the sealant fitting is formed of a metallic material, so that it is very difficult to meet an accurate criteria such as the deviation from sphere, thereby not only limiting the function of blocking the fluid but also causing a high possibility of having scratches when the metal ball is in contact with other metal components.

DISCLOSURE

Technical Problem

The present invention is directed to a sealant fitting and a novel method of manufacturing the same, which significantly improves the structure of the sealant fitting, so that a fluid leakage or component damage does not occur at all even when the sealant fitting is installed on a high pressure valve, the conventional processes as described above are not required at all, manufacturing processes thereof and the production unit price are decreased, and, quality, safety and uniformity thereof are also obtained.

Technical Solution

One aspect of the present invention is to provide a sealant fitting, which includes: a spring coupling unit 150 having an internal screw thread 140 for coupling unit assembly disposed below the ball installation groove 103 of the sealant body 100, the internal screw thread 140 having a hexagonal groove 151 for preventing a downward separation of the coil spring 130, allowing a fluid to flow and facilitating fastening and releasing of the screw, and having an external screw thread 152 at an outer circumference of the spring coupling unit; and outer sealing O-rings 160 and 160-1 disposed in O-ring installation grooves 161 formed on respective upper and lower positions of the valve coupling taper screw part 101-1 formed on the outer lower side of the sealant body 100.

Advantageous Effects

According to a valve sealant fitting and a method of manufacturing the same of the present invention, the valve sealant has a complete sealing property, so that it can completely prevent the fluid and gas from being leaked even when the sealant fitting is applied for a high pressure valve or an ultra-low temperature valve, many processes can be decreased, significant material and production unit price savings can be expected, and the quality of the sealant fitting can also be safely and uniformly maintained particularly at the time of manufacturing the sealant fitting.

DETAILED DESCRIPTION OF EMBODIMENTS OF INVENTION

Figure 1:
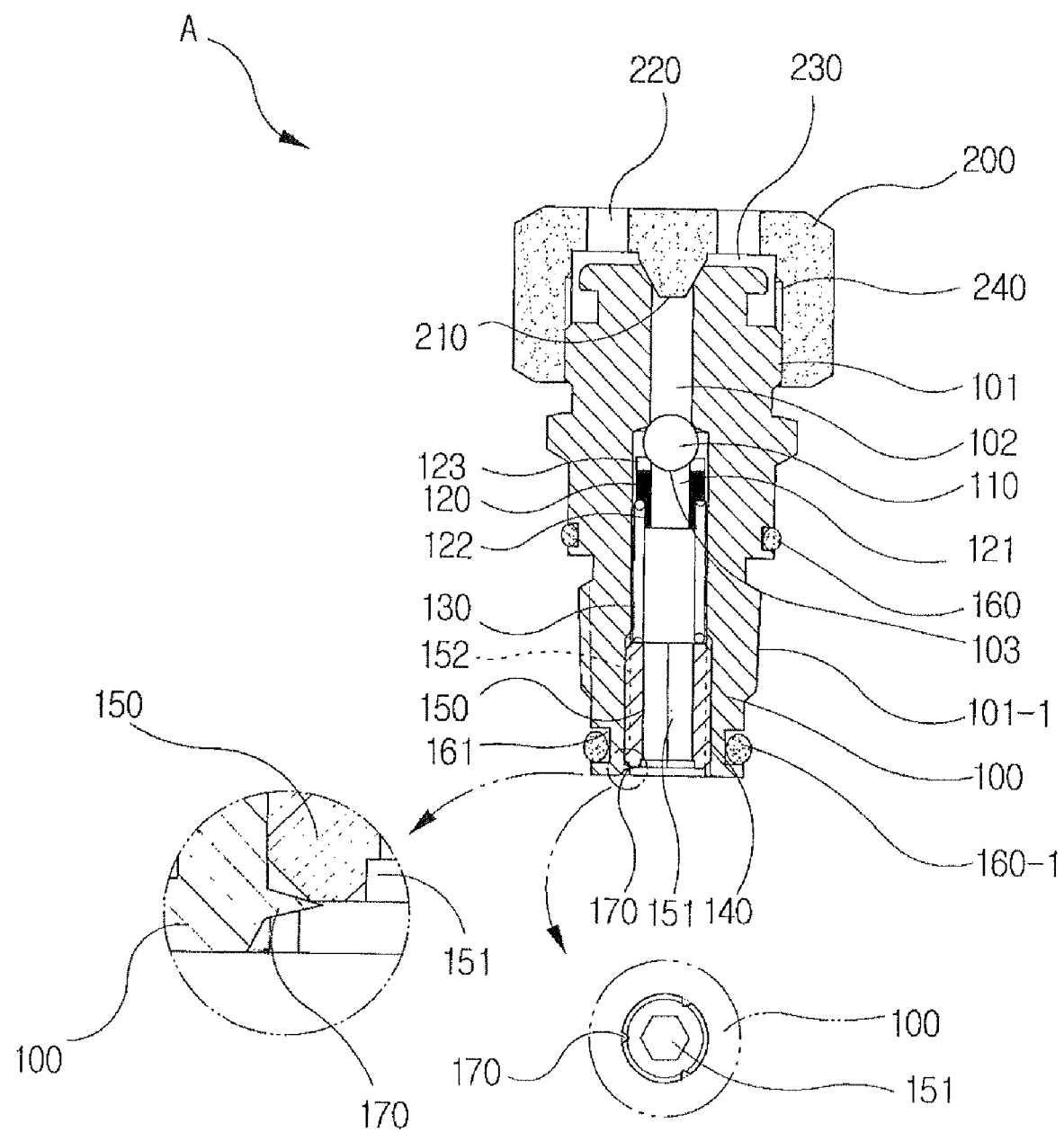
FIG. 1 illustrates a preferred embodiment of the present invention.
Figure 2:
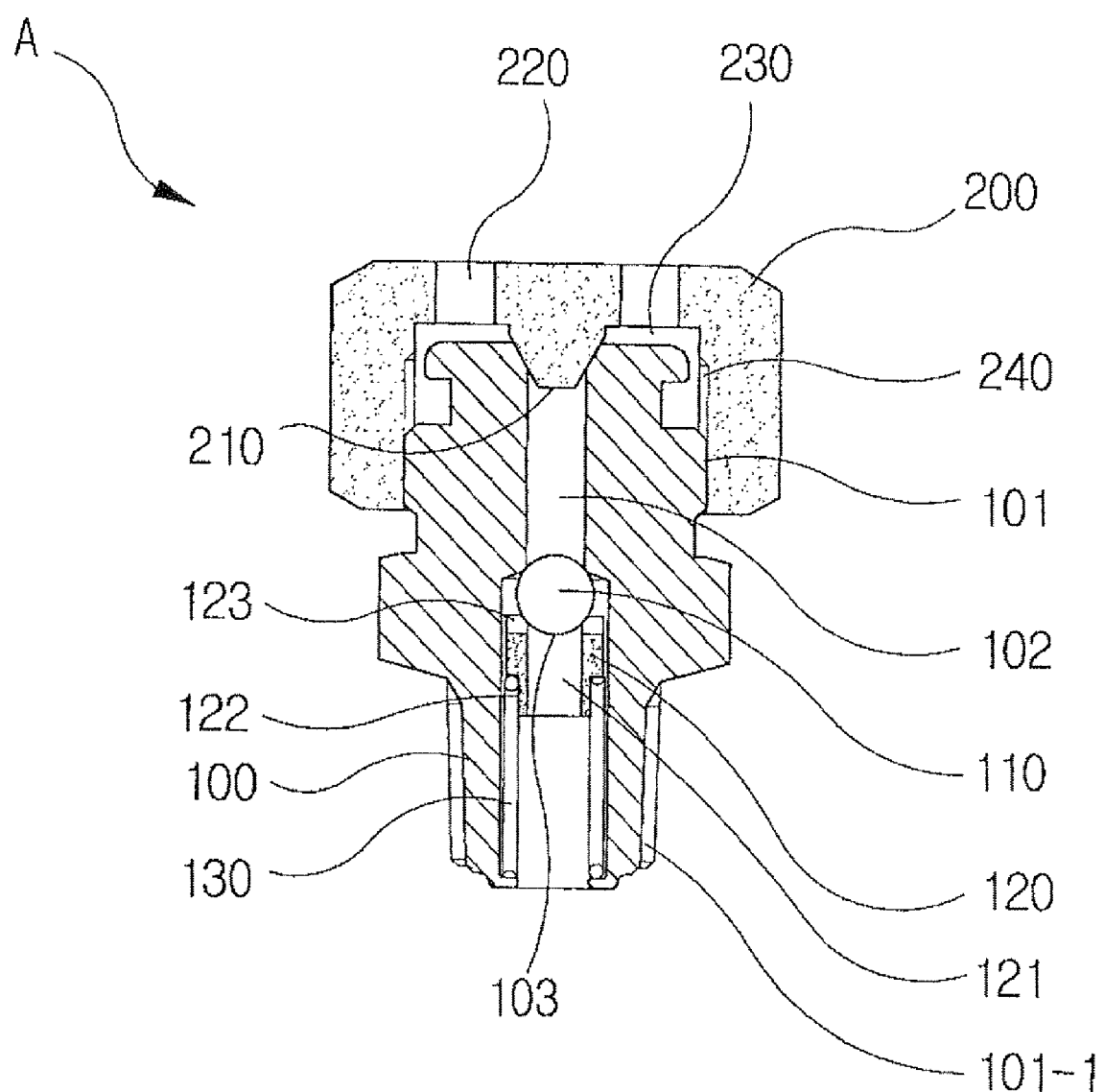
FIG. 2 illustrates another embodiment of the present invention.
Figure 3:
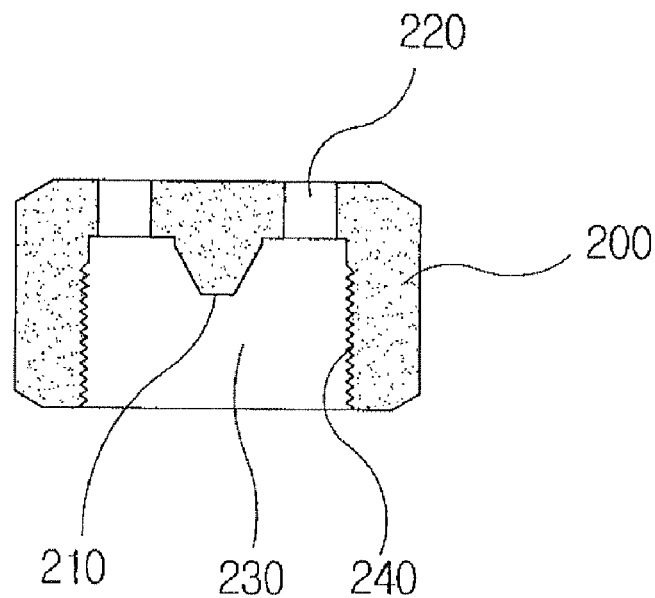
FIGS. 3 to 5 illustrate a cross-sectional view, a disassembled perspective view, and a process view, of a vent cap and a method of manufacturing the vent cap in accordance with the present invention, respectively.
Figure 4:
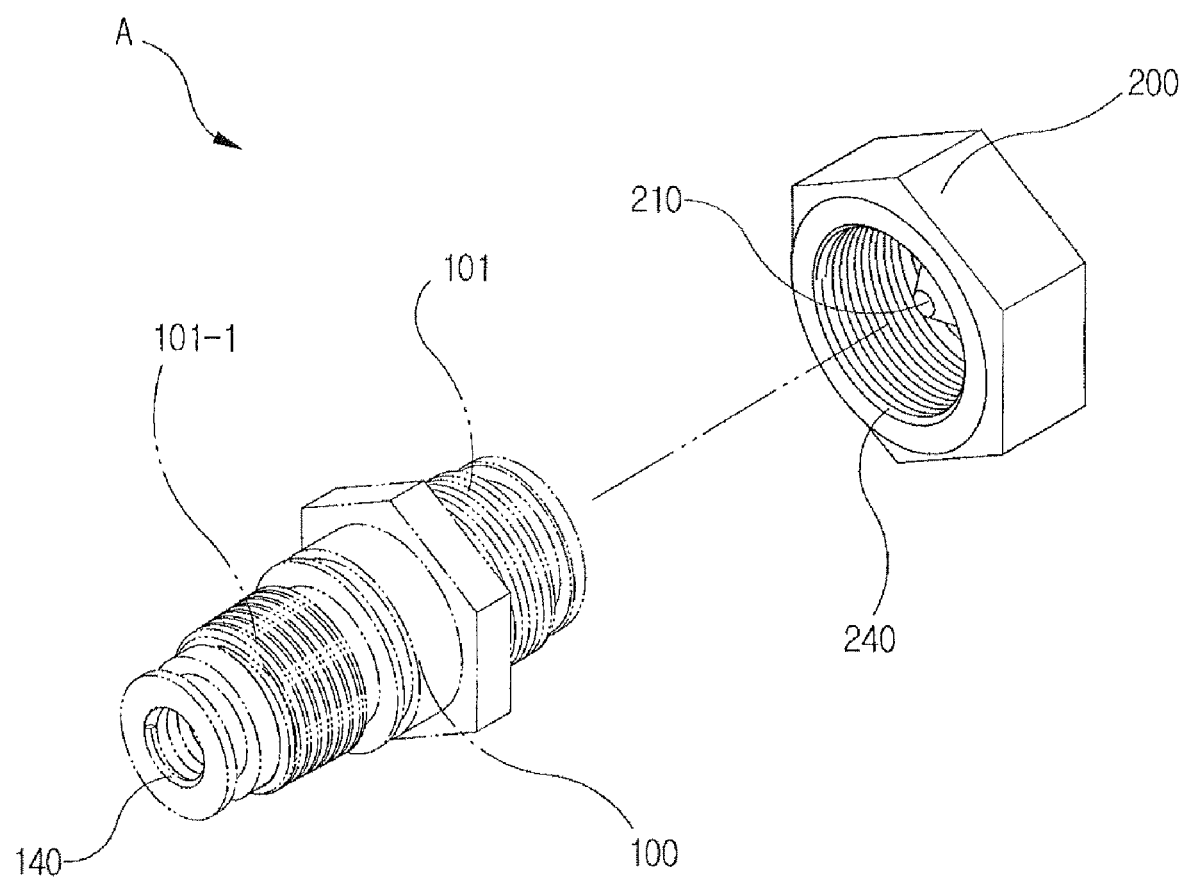
Figure 5:
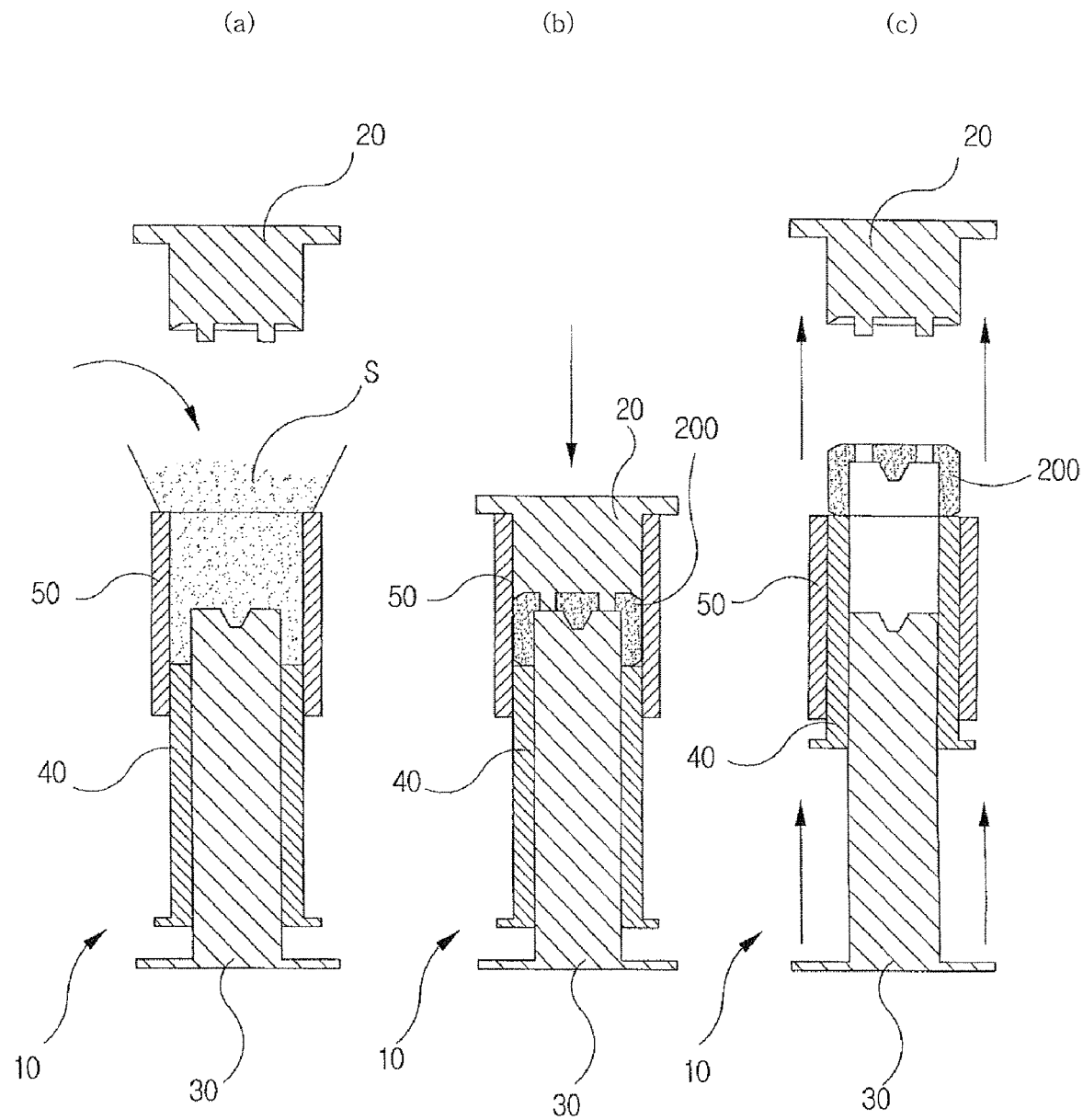
Figure 6:
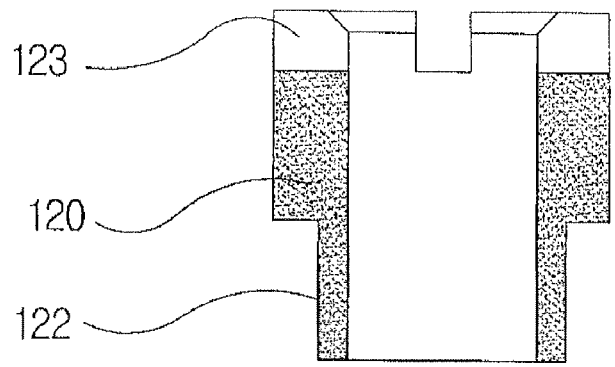
FIGS. 6 to 8 illustrate a cross-sectional view, a disassembled perspective view, and a process view, of a ball seat and a method of manufacturing the ball seat in accordance with the present invention, respectively.
Figure 7:
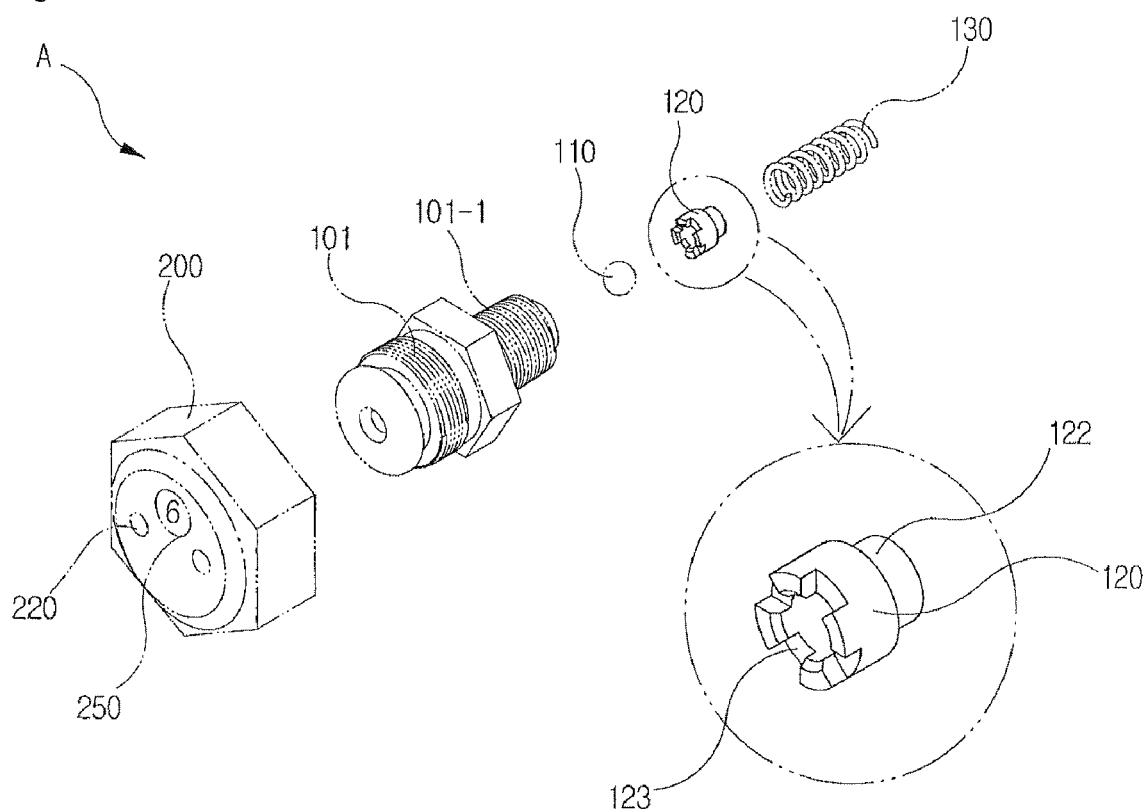
Figure 8:
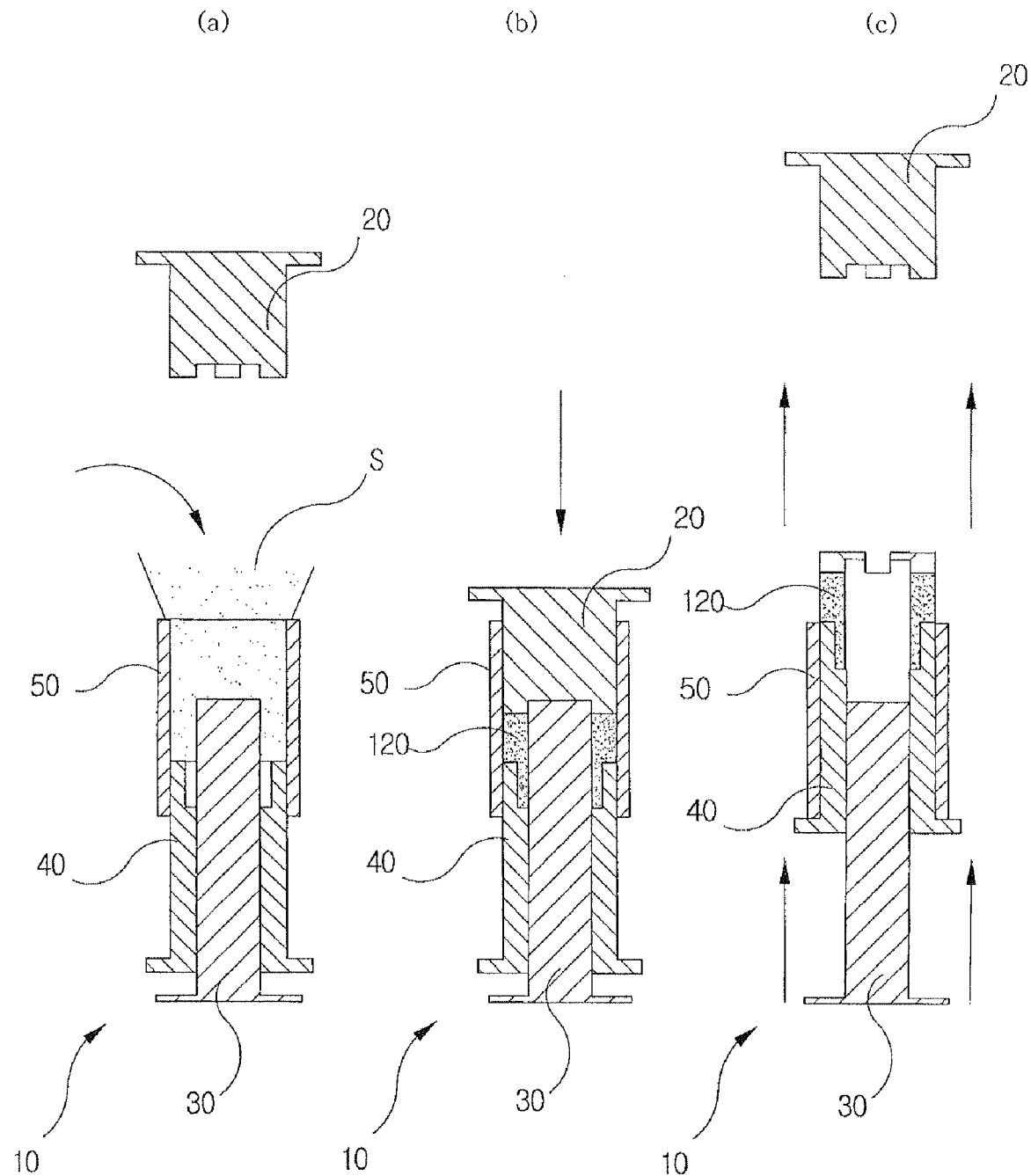

The present invention will now be described in detail with reference to accompanying drawings.

A sealant fitting A of the present invention includes a sealant body 100 and a vent cap 200, wherein the sealant body has a cap coupling screw part 104 disposed on an outer upper end of the sealant body, a valve coupling taper screw part 101-1 disposed on an outer lower end of the sealant body, a sealant injection hole 102 disposed on its inner upper end and a ball installation groove 103 disposed on its inner lower end, the ball installation groove 103 has a ball 110 while a ball seat 120 and a coil spring 130 are sequentially disposed downward from the ball installation groove, the vent cap has a protrusion 210 for discharging an inner air and additionally blocking the sealant injection hole 102 and one or more punched vent groove 220, the vent cap is coupled to the cap coupling screw part 101 of the sealant body 100, and the sealant fitting further includes:

a spring coupling unit 150 having an internal screw thread 140 for coupling unit assembly below the ball installation groove 103 of the sealant body 100, the internal screw thread 140 having a hexagonal groove 151 for preventing a downward separation of the coil spring 130, allowing a fluid to flow and facilitating fastening and releasing of the screw, and having an external screw thread 152 at an outer circumference of the spring coupling unit; and outer sealing O-rings 160 and 160-1 disposed in O-ring installation grooves 161 formed on respective upper and lower positions of the valve coupling taper screw part 101-1 formed on the outer lower side of the sealant body 100.

The spring coupling unit 150 is additionally mounted below the ball installation groove 103 in the sealant body 100 of the sealant fitting A as described above, so that a secure internal mounting property of the ball 110, the ball seat 120 and the coil spring 130 with respect to the ball installation groove 103 can be guaranteed, thereby obtaining the sealant fitting A of high quality that is sufficiently resistant against a high pressure valve.

The sealant fitting further includes a caulking part 170 disposed at a lower end of the ball installation groove 103 where the spring coupling unit 150 is mounted so that the spring coupling unit 150 can be prevented in advance from being unfastened or deviated due to any reasons (e.g., vibration or the like).

In addition, the outer sealing O-rings 160 and 160-1 are further formed on upper and lower sides of the valve coupling taper screw part 104-1 formed at the outer lower side of the sealant body 100 as described above, the sealant can be completely prevented from being leaked out of a fine gap of the valve coupling taper screw part 101-1, which was not taken into consideration in the conventional art, so that the sealing function of the sealant fitting according to the present invention can be more enhanced.

In addition, the ball 110 as a main component of the sealant fitting for allowing the fluid to be injected and adjusting the injection blocking among constitutional components of the sealant fitting A has an oxygen-free property, and uses any one selected from a group consisting of a silicon nitride ($Si_3N_4$) ball, a silicon Carbide (SiC) ball, an alumina ($AlO_3$) ball, and a zirconia ($ZrO_2$) ball that are formed by a high temperature sintering, have a high density, a high hardness, a high temperature intensity, a corrosion-resistant property, and an abrasion-resistant property while internal impurities of the balls are decreased. Therefore, the deviation from sphere of the ball can be improved as much as possible, and defects such as abrasion, scratch or the like can be reduced, thereby significantly contributing to the function of blocking the fluid.

A method of manufacturing the sealant fitting A of the present invention will now be described in detail.

In a sealant fitting A comprising a sealant body 100, a vent cap 200, and a ball seat 120, wherein the sealant body has a cap coupling screw part 101 disposed on an outer upper end of the sealant body, a valve coupling taper screw part 101-1 disposed on an outer lower end of the sealant body, a sealant injection hole 102 disposed on its inner upper end and a ball installation groove 103 disposed on its inner lower end, the ball installation groove 103 has a ball 110 while the ball seat 120 and a coil spring 130 are sequentially disposed downward from the ball installation groove, the vent cap has a protrusion 210 for discharging an inner air and additionally blocking the sealant injection hole 102 and one or more punched vent groove 220, the vent cap is coupled to the cap coupling screw part 101 of the sealant body 100, the vent cap 200 having a coupling groove 230 with a constant diameter inside the vent cap, an internal screw thread 240 formed on an inner wall of the coupling groove 230, a protrusion 210 protruded from an inner central position of the coupling groove, one or more vent groove 220 punched on an upper end of the vent cap, and a marking part 250 formed on an upper surface of the vent cap, the ball seat 120 has an inner groove 121, a lower spring sustaining protrusion 122, and a groove 123 for tight contact with the ball and fluid communication, and the method of manufacturing the vent cap 200 and the ball seat 120 includes the steps as follows:

the method includes: selecting one or more metal powder material S meeting a certain mechanical property and mixing the materials together; injecting the mixed metal powder materials S into a separate mold die 50 with an inner pin 40 having a certain shape and being fixed in the die, and pressing the metal powder materials by means of a mold-pressing device 10 composed of an upper punch 20 and a lower punch 30 processed according to shapes of the ball seat 120 and the vent cap 200 of interest to be molded to mold the materials into a predetermined shape; sintering the pressed and molded predetermined shape of the materials at a temperature that is substantially high, constant, and adjusted to a degree not greater than a melting point so that the pressed metal particles have a sufficient metallic bonding property; and performing post-processing by carrying out surface heat treatment required for a portion or an entire part of the sintered alloy mold and removing a bur or a sharp edge that may be present on the surface by means of brushing.

In addition, the mold-pressing device 10 used for the pressing process has the mold die 50 in which the outer shapes of the vent cap 200 and the ball seat 120 are processed, the upper punch 20 and the lower punch 30 for inward pressing are disposed at respective upper and lower sides of the mold die 50, and the mold-pressing device has the inner pin 40 that penetrates the insides of the lower punch 30 and the mold die 50 for determining the internal diameter shape of the bush.

According to the method of manufacturing the vent cap 200 and the ball seat 120 as components of the sealant fitting A of the present invention, the method was not taken into consideration in the conventional art when the sealant fitting A needs to be manufactured, and the sealant fitting can be rapidly, easily and accurately manufactured by the method of the present invention, so that many costs, human resources, times, and processes can be saved compared to the conventional method of carrying out many processes including at least twelve processes and at least five mechanical processes as described above, and scraps that have occurred on usual mechanical processes do not occur so that damages of the materials for the sealant fitting can be decreased as much as possible.

In addition, the manufacturing process of the present invention can be rapidly and easily carried out so that a manufacturing time thereof can be significantly reduced compared to the conventional art, which also contributes to a mass production thereof. In particular, the sealant fitting has a dimensional accuracy, a surface degree and a quality superior to the conventional mechanical processes so that it can significantly contribute to the safety and uniformity of the sealant fitting product.

In addition, the mold-pressing device 10 composed of the mold die 50, the upper punch 20, the lower punch 30, and the inner pin 40 used for the pressing process of the manufacturing processes described above allows its pressing process to be easily and effectively carried out, so that the mold for the sealant fitting having a more accurate quality can be obtained, and the mold can be easily ejected/discharged from the mold die 50, thereby significantly enhancing the manufacturing property of the sealant fitting A.

What is claimed is:

1. In a sealant fitting (A) comprising a sealant body (100), a vent cap (200), and a ball seat (120), the sealant body having a cap coupling screw part (101) disposed on an outer upper end of the sealant body, a valve coupling taper screw part (101-1) disposed on an outer lower end of the sealant body, a sealant injection hole (102) disposed on an inner upper end and a ball installation groove (103) disposed on an inner lower end, the ball installation groove (103) having a ball (110) while the ball seat (120) and a coil spring (130) being sequentially disposed downward from the ball installation groove, the vent cap having a protrusion (210) for discharging an inner air and additionally blocking the sealant injection hole (102) and one or more punched vent grooves (220), the vent cap being coupled to the cap coupling screw part (101) of the sealant body (100), the vent cap (200) having a coupling groove (230) with a constant diameter inside the vent cap, an internal screw thread (240) formed on an inner wall of the coupling groove (230), the protrusion (210) protruded from an inner central position of the coupling groove, one or more vent grooves (220) punched on an upper end of the vent cap, and a marking part (250) formed on an upper surface of the vent cap, the ball seat (120) having an inner groove (121), a lower spring sustaining protrusion (122), and a groove (123) for tight contact with the ball and fluid communication, a method of manufacturing the vent cap (200) and the ball seat (120), comprising the steps of:

selecting one or more metal powder materials S meeting a certain mechanical property and mixing the one or more metal powder materials together;

injecting the one or more metal powder materials S into a separate mold die (50) with an inner pin (40) having a certain shape and being fixed in the die, and pressing the metal powder materials by means of a mold-pressing device (10) composed of an upper punch (20) and a lower punch (30) processed according to shapes of the ball seat (120) and the vent cap (200) of interest to be molded to mold the materials into a predetermined shape;

sintering the predetermined shape of the materials at a temperature that is substantially high, constant, and adjusted to a degree not greater than a melting point so that the pressed metal particles have a sufficient metallic bonding property; and performing post-processing by carrying out surface heat treatment required for a portion or an entire part of the sintered alloy mold and removing a bur or a sharp edge that may be present on the surface by means of brushing.

* * * * *